(12) United States Patent
Kitagawa

(10) Patent No.: US 12,418,725 B2
(45) Date of Patent: Sep. 16, 2025

(54) CONTROL APPARATUS AND CONTROL METHOD THEREFOR

(71) Applicant: CANON KABUSHIKI KAISHA, Tokyo (JP)

(72) Inventor: Eiichiro Kitagawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/357,740

(22) Filed: Jul. 24, 2023

(65) Prior Publication Data

US 2024/0040262 A1 Feb. 1, 2024

(30) Foreign Application Priority Data

Jul. 27, 2022 (JP) .................... 2022-119838

(51) Int. Cl.
| | |
|---|---|
| *H04N 23/72* | (2023.01) |
| *H04N 7/10* | (2006.01) |
| *H04N 23/20* | (2023.01) |
| *H04N 23/65* | (2023.01) |
| *H04N 23/74* | (2023.01) |
| *H04N 23/75* | (2023.01) |

(52) U.S. Cl.
CPC ............ *H04N 23/72* (2023.01); *H04N 7/102* (2013.01); *H04N 23/20* (2023.01); *H04N 23/65* (2023.01); *H04N 23/74* (2023.01); *H04N 23/75* (2023.01)

(58) Field of Classification Search
None
See application file for complete search history.

(56) References Cited

U.S. PATENT DOCUMENTS

| | | | | |
|---|---|---|---|---|
| 2003/0038687 A1* | 2/2003 | Hackney | ............... | H01P 1/202 333/17.2 |
| 2007/0189759 A1* | 8/2007 | Kobayashi | ............ | H04N 23/20 348/E5.04 |
| 2014/0225563 A1* | 8/2014 | Ichikawa | ............... | B60L 50/16 320/108 |
| 2019/0364187 A1 | 11/2019 | Kawasaki | | |
| 2020/0213486 A1 | 7/2020 | Liu | | |
| 2020/0314317 A1 | 10/2020 | Motohashi | | |
| 2021/0274064 A1* | 9/2021 | Bangs | ................... | H04N 23/66 |

FOREIGN PATENT DOCUMENTS

| | | |
|---|---|---|
| JP | 2020137020 A | 8/2020 |
| JP | 2020167506 A | 10/2020 |

* cited by examiner

*Primary Examiner* — Clifford Hilaire
(74) *Attorney, Agent, or Firm* — Canon U.S.A., Inc. IP Division

(57) ABSTRACT

A control apparatus communicates with an external apparatus via a coaxial cable and receives supply of power via the coaxial cable. The apparatus comprising: a first functional unit; a second functional unit; a power supply unit configured to supply power to the first and the second functional units by using power supplied via the coaxial cable; and a control unit configured to control the first and the second control units in accordance with a control instruction received from the external apparatus. The control unit controls execution timings of a first control operation and a second control operation based on (i) operation contents of the first control operation to be executed, (ii) operation contents of the second control operation to be executed, (iii) an operation state of the first functional unit, and (iv) an operation state of the second functional unit.

8 Claims, 5 Drawing Sheets

CONTROL APPARATUS AND CONTROL METHOD THEREFOR

BACKGROUND

Field of the Disclosure

The present disclosure relates to the control of a sensing device.

Description of the Related Art

There has been developed a modular type camera in which a sensor unit equipped with an image sensor is connected to a control unit configured to transmit a captured video to a network via a coaxial cable. Such a camera can supply power from the control unit to the sensor unit, transmit a captured video from the sensor unit to the control unit, and perform two-way command communication via one coaxial cable. For this reason, such a camera is used in a place with a narrow installation space as in the case of a vehicle-mounted camera.

When supply power is superimposed on a transmission signal on a coaxial cable, the current of the transmission signal may leak to the power supply side to result in a deterioration in transmission quality depending on the characteristics of a filter that separates the transmission signal from the power. Japanese Patent Laid-Open No. 2020-137020 discloses a technique of preventing a deterioration in transmission quality by compensating for signal attenuation using an equalizer function.

In the above modular type camera, driving various types of driving devices (an infrared illumination, a filter, and the like) in the sensor unit will cause increases and decreases in power consumption. This may cause variations in the voltage level of the coaxial cable. When the power consumption in the sensor unit abruptly increases, in particular, data transmission via the coaxial cable sometimes cannot be properly performed. When a plurality of sensor units are connected to a control unit and simultaneously used, a limitation is imposed on power consumption per sensor unit, thus imposing a limitation on the functions of sensor units which can be used.

SUMMARY

According to one aspect of the present disclosure, a control apparatus configured to communicate with an external apparatus via a coaxial cable and receive supply of power via the coaxial cable, the apparatus comprises: a first functional unit; a second functional unit different from the first functional unit; a power supply unit configured to supply power to the first functional unit and the second functional unit by using power supplied via the coaxial cable; and a control unit configured to control the first functional unit and the second control unit in accordance with a control instruction received from the external apparatus, wherein the control unit controls execution timings of a first control operation and a second control operation based on (i) operation contents of the first control operation to be executed based on a first control instruction for the first functional unit, (ii) operation contents of the second control operation to be executed based on a second control instruction for the second functional unit, (iii) an operation state of the first functional unit, and (iv) an operation state of the second functional unit.

The present disclosure enables data transmission with reduced errors.

Further features of the present disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

DESCRIPTION OF THE EMBODIMENTS

Figure 1:
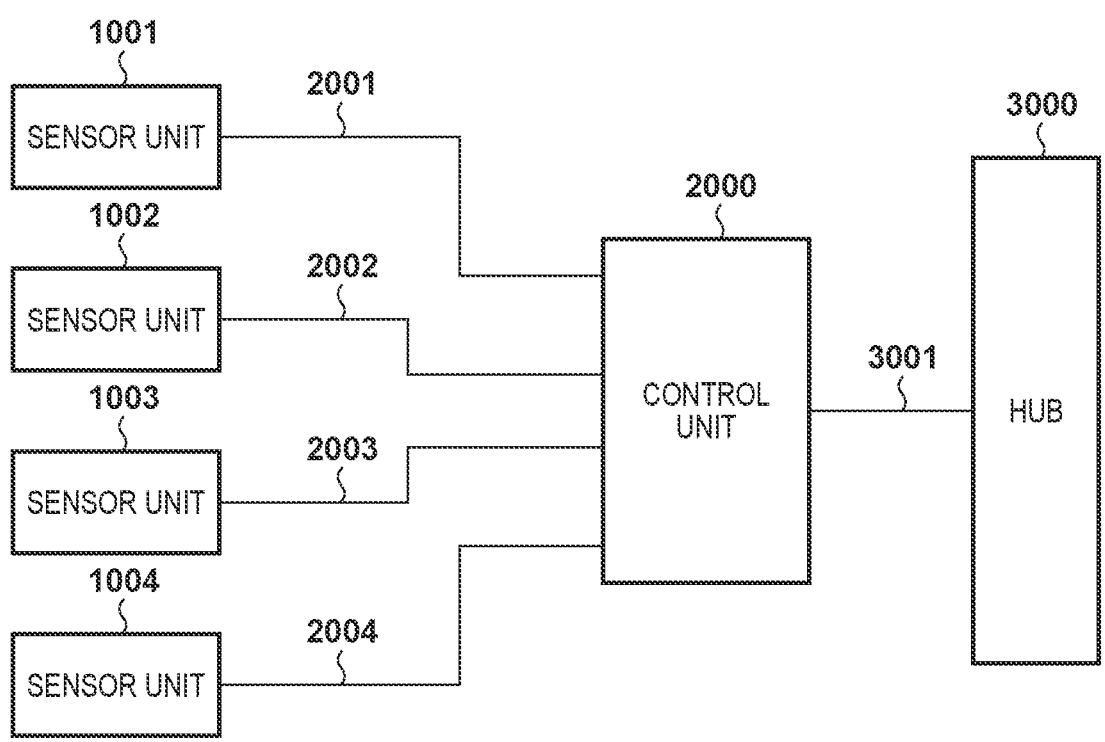
FIG. 1 is a block diagram showing the overall arrangement of an image capturing system.

Hereinafter, embodiments will be described in detail with reference to the attached drawings. Note, the following embodiments are not intended to limit the scope of the claimed disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

First Embodiment

The first embodiment of a control apparatus according to the present disclosure will exemplify a sensor unit in a monitoring system. The sensor unit as an image capturing apparatus operates on power superimposed on a coaxial cable used for communication.

<Overall Arrangement of Monitoring System>

FIG. 1 shows the overall arrangement of a monitoring system. The monitoring system includes sensor units 1001, 1002, 1003, and 1004, a control unit 2000, and a HUB 3000. The respective sensor units are connected to the control unit via coaxial cables 2001, 2002, 2003, and 2004, and the control unit is connected to the HUB 3000 via a LAN cable 3001.

The HUB 3000 is an Ethernet HUB complying with PoE (including PoE+). The control unit 2000 operates on power supplied from the HUB 3000 via an Ethernet cable. The control unit 2000 supplies power to the sensor units 1001, 1002, 1003, and 1004 via the respective coaxial cables based on power supplied from the HUB 3000. That is, each sensor unit operates on power supplied from the control unit 2000 via a coaxial cable.

A coaxial cable is, for example, a single-core coaxial cable, which is composed of a internal conductor and an external conductor. The internal conductor is a single conductor, and the external conductor is a shield wire having a cylindrical shape having the internal conductor in the center.

Each sensor unit transmits a captured video to the control unit 2000 via the coaxial cable. In addition, each sensor unit is configured to communicate with the control unit 2000 via the coaxial cable. For example, each sensor unit receives a control signal for the operation of each device in the sensor unit and performs control based on the control signal. The control signal includes, for example, a control signal for ON/OFF control of an infrared (IR) illumination, a control signal for insertion-extraction control of an infrared (IR) cut filter, and a control signal for the acquisition control of microcomputer information (such as version). As described above, video signals, control signals, and power are all superimposed on the coaxial cable.

As shown in FIG. 1, by having a plurality of coaxial connectors and a plurality of deserializers, the control unit 2000 allows the connection of a plurality of sensor units. Although FIG. 1 shows the four sensor units, an arbitrary number of sensor units can be used. Note, however, that the total amount of power that the control unit 2000 can supply to all the sensor units is limited depending on the supply power supplied from the HUB 3000.

<Arrangement of Sensor Unit>

Figure 2:
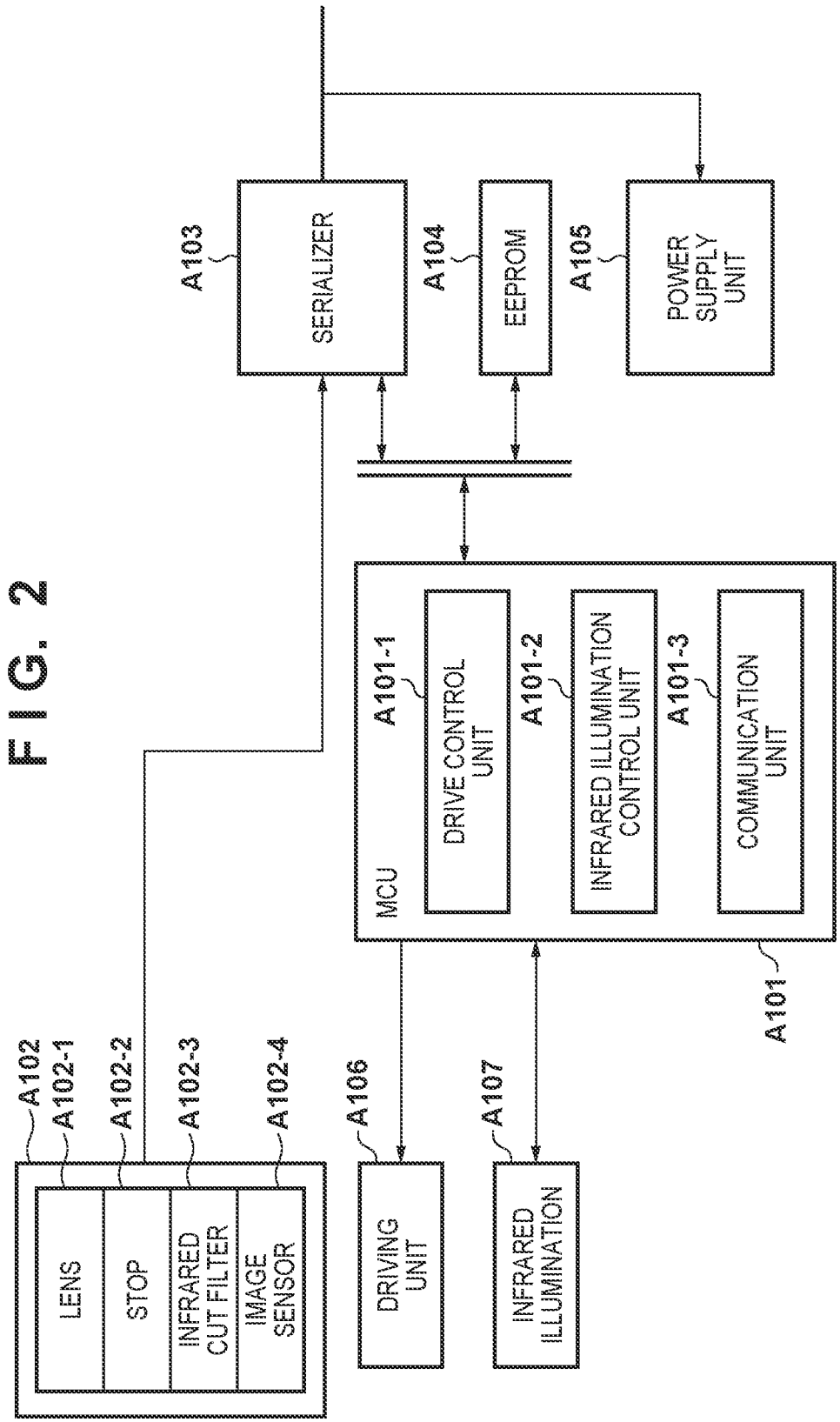
FIG. 2 is a block diagram showing the arrangement of a sensor unit according to one or more aspects of the present disclosure.

FIG. 2 is a block diagram showing the arrangement of a sensor unit according to the first embodiment. As described above, the sensor unit is an image capturing apparatus that operates on power supplied from the control unit 2000.

A computer A101 is a microcontroller unit (MCU) that comprehensively controls the movement of the overall sensor unit and is also referred to as a microcomputer. An image capturing unit A102 captures an image of an object via a lens and converts the captured image into a video signal. The image capturing unit A102 is constituted by a lens group A102-1, a stop A102-2, an infrared cut filter A102-3, and an image sensor A102-4.

A serializer A103 superimposes a video signal from the image capturing unit A102 and signals from the microcomputer A101 and an EEPROM A104 and transmits the resultant signal to the control unit. The serializer A103 separates a control signal from the power supplied from the control unit 2000 and transmits the control signal to the microcomputer A101. The serializer A103 communicates with the control unit 2000 via the coaxial cable by using, for example, I2C protocol.

The EEPROM A104 stores various types of information such as an ID for identifying a sensor unit. A power supply unit A105 supplies power to each unit in the sensor unit based on the power supplied from the control unit 2000.

A driving unit A106 is an insertion-extraction control unit (for example, a stepping motor) that inserts/extracts the infrared cut filter A102-3 with respect to an optical path. An infrared illumination unit A107 projects infrared light in an image capturing direction in low light conditions (for example, nighttime).

The microcomputer A101, the serializer A103, and the EEPROM A104 are communicably connected to each other via a bus in the sensor unit.

The microcomputer A101 includes functional blocks A101-1, A101-2, and A101-3. Each functional block is implemented by hardware, software, or a combination of them.

The drive control unit A101-1 controls the insertion-extraction of the infrared cut filter A102-3 with respect to the optical path. A specific control operation for implementing the operation details is the control performed by the drive control unit A101-1 to supply a pulse signal to the driving unit A106 as a stepping motor. The infrared illumination control unit A101-2 controls (ON/OFF and brightness control) an infrared illumination A107 upon reception of a control instruction for the infrared illumination from the control unit 2000. An example of specific control operations for the implementation of the operation details is the adjustment performed by the infrared illumination control unit A101-2 for the amount of current supplied to the infrared illumination A107 by PID control. The infrared illumination control unit A101-2 manages the current power value of the infrared illumination. The communication unit A101-3 is a communication unit that communicates with the control unit via the serializer.

<Operation of Sensor Unit>

Figure 3:
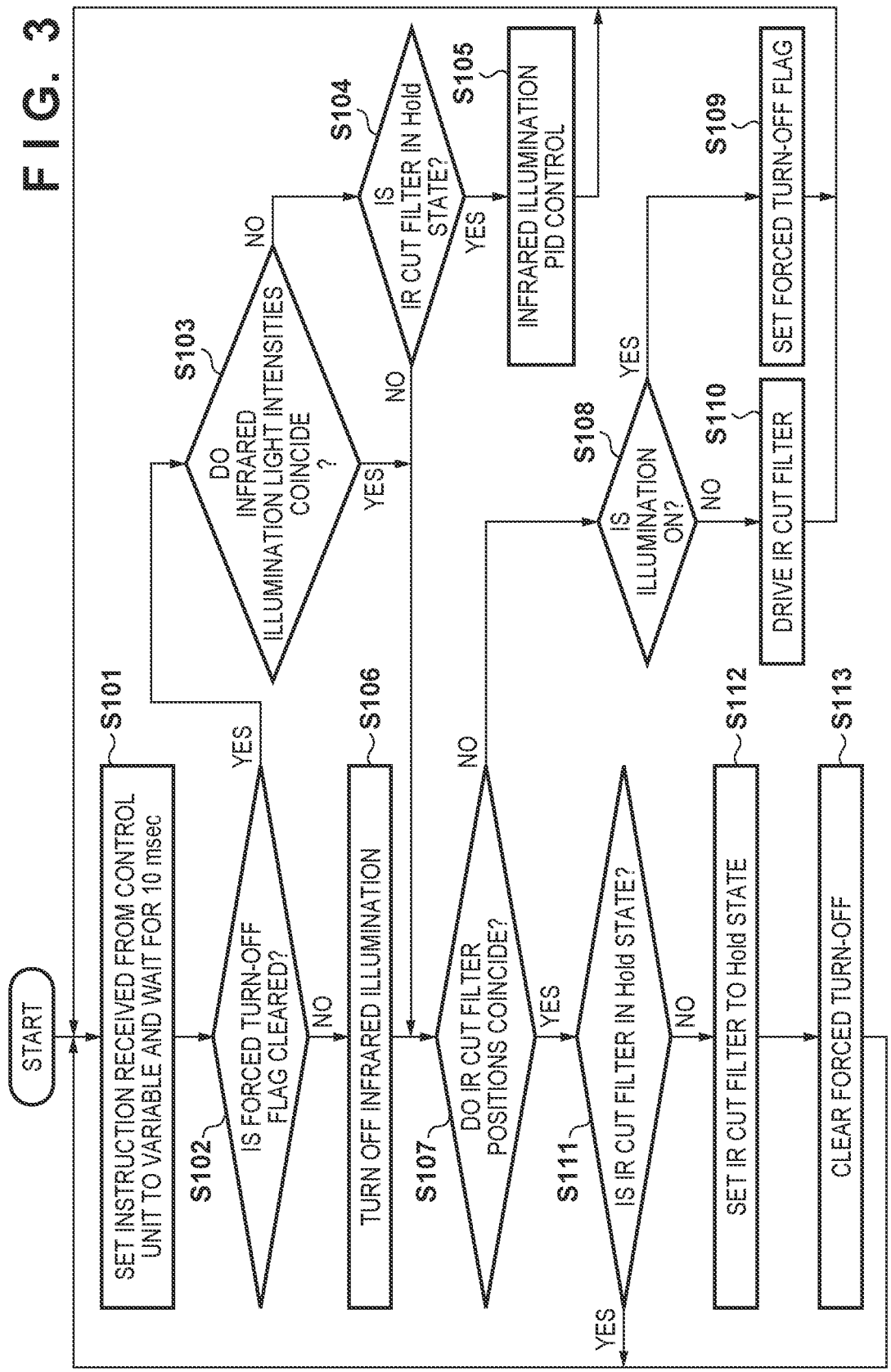
FIG. 3 is a flowchart of processing in the first embodiment.

FIG. 3 is a flowchart of control processing for the sensor unit according to the first embodiment. More specifically, FIG. 3 shows an operation to be performed when the sensor unit receives a control instruction (command) from the control unit 2000 while performing an image capturing operation. The following will describe a case in which instructions for two functional units are received as control instructions. More specifically, the following is a description about a form configured to receive instructions concerning control (ON/OFF and brightness control) of the infrared illumination A107 and control (insertion-extraction control with respect to the optical path) of the infrared cut filter A102-3.

In step S101, the communication unit A101-3 receives an instruction from the control unit 2000 via the serializer A103. The communication unit A101-3 sets the received instruction to a variable and waits for a predetermined time (for example, 10 msec).

For example, upon receiving an instruction for "control of infrared illumination" from the control unit 2000, the communication unit A101-3 sets the power value consumed by the infrared illumination A107 to a variable. The communication unit A101-3 then waits for the reception of an instruction for "control of infrared cut filter" for a predetermined time.

Upon receiving the instruction for "control of infrared cut filter", the communication unit A101-3 sets the position (ON or OFF position) of the infrared cut filter A102-3 to a variable. In this case, the ON position indicates the position where the filter is inserted in the optical path, and the OFF position indicates the position where the filter is extracted from the optical path.

In step S102, the communication unit A101-3 obtains the value of "forced turn-off flag" from the infrared illumination control unit A101-2 and checks whether the forced turn-off flag is cleared. If the flag is not cleared (for example, the value is "1"), the process advances to step S106. If the flag is cleared (for example, the value is "0"), the process advances to step S103. Note that "forced turn-off lag" is set in step S109 described later, and hence this determination may be performed only in the second or more cycle of loop control in FIG. 3.

In step S103, the infrared illumination control unit A101-2 compares the current power value with the power value set to the variable in step S101. If the values coincide with each other, the process advances to step S107. If the values do not coincide with each other, the process advances to step S104.

In step S104, the infrared illumination control unit A101-2 obtains "drive state with respect to infrared cut filter" from the drive control unit A101-1 and determines whether the filter is in a stopped state (hold state). If the filter is in a stopped state, the process advances to step S105. If the filter is not in a stopped state (that is, in a driven state), the process advances to step S107. A stopped state indicates a hold state in which stop excitation is applied to the stepping motor.

In step S105, the infrared illumination control unit A101-2 adjusts a current value flowing in the infrared illumination A107 by PID control so as to set the power value set to the variable in step S101. The process then returns to step S101.

In step S106, the infrared illumination control unit A101-2 controls a current value by turning off the infrared illumination A107. The process then advances to step S107.

In step S107, the drive control unit A101-1 checks whether the current position (ON or OFF position) of the infrared cut filter A102-3 coincides with the designated position in the instruction received in step S101. If the positions coincide with each other, the process advances to step S111. If the positions do not coincide with each other, the process advances to step S108.

In step S108, the drive control unit A101-1 determines whether the infrared illumination A107 is on. If the illumination is on, the process advances to step S109. If the illumination is not on, the process advances to step S110. In step S109, the drive control unit A101-1 sets a forced turn-off flag (sets the value to, for example, "1"). The process then returns to step S101.

In step S110, the drive control unit A101-1 drives the infrared cut filter A102-3 in a direction to a designated position in a predetermined drive pattern.

In step S111, the drive control unit A101-1 checks "drive state with respect to infrared cut filter" and determines whether the filter is in a stopped state (hold state). If the filter is in a stopped state, the process advances to step S101. If the filter is not in a stopped state, the process advances to step S112.

In step S112, the drive control unit A101-1 stops the driving unit A106 and sets a driven state with respect to the infrared cut filter to a hold state. For example, stop excitation is applied to the stepping motor.

In step S113, the drive control unit A101-1 clears the forced turn-off flag (sets the value to, for example, "0"). The process then returns to step S101.

The above control makes it possible to give priority to drive control on the infrared cut filter upon receiving both an instruction concerning drive control for the infrared cut filter and an instruction concerning drive control for infrared illumination. It is also possible to control a processing sequence so as to inhibit drive control for the infrared cut filter while the infrared illumination is on.

As described above, according to the first embodiment, upon receiving a plurality of control instructions in a predetermined time (for example, 10 msec), the sensor unit can perform adaptive processing in consideration of power consumption in the execution of the plurality of control instructions. For example, performing exclusive control in driving (control operation) of the infrared illumination and the infrared cut filter can reduce the peak power consumption of the sensor unit. In addition, reducing the peak power consumption will also reduce variations in power consumption, thereby enabling to reduce errors in communication via the coaxial cable. Furthermore, reducing the peak power consumption in each sensor unit allows the control unit to simultaneously control more sensor units in parallel.

Second Embodiment

The second embodiment will exemplify a case in which the sensor unit further includes a heater. The second embodiment differs from the first embodiment in that control is modified in accordance with the occurrence of a communication error when the execution of a plurality of types of control (for an illumination, filter, and heater) is started. Note that since the overall arrangement of the system is the same as that in the first embodiment (FIG. 1), a description of the arrangement will be omitted.

<Arrangement of Sensor Unit>

Figure 4:
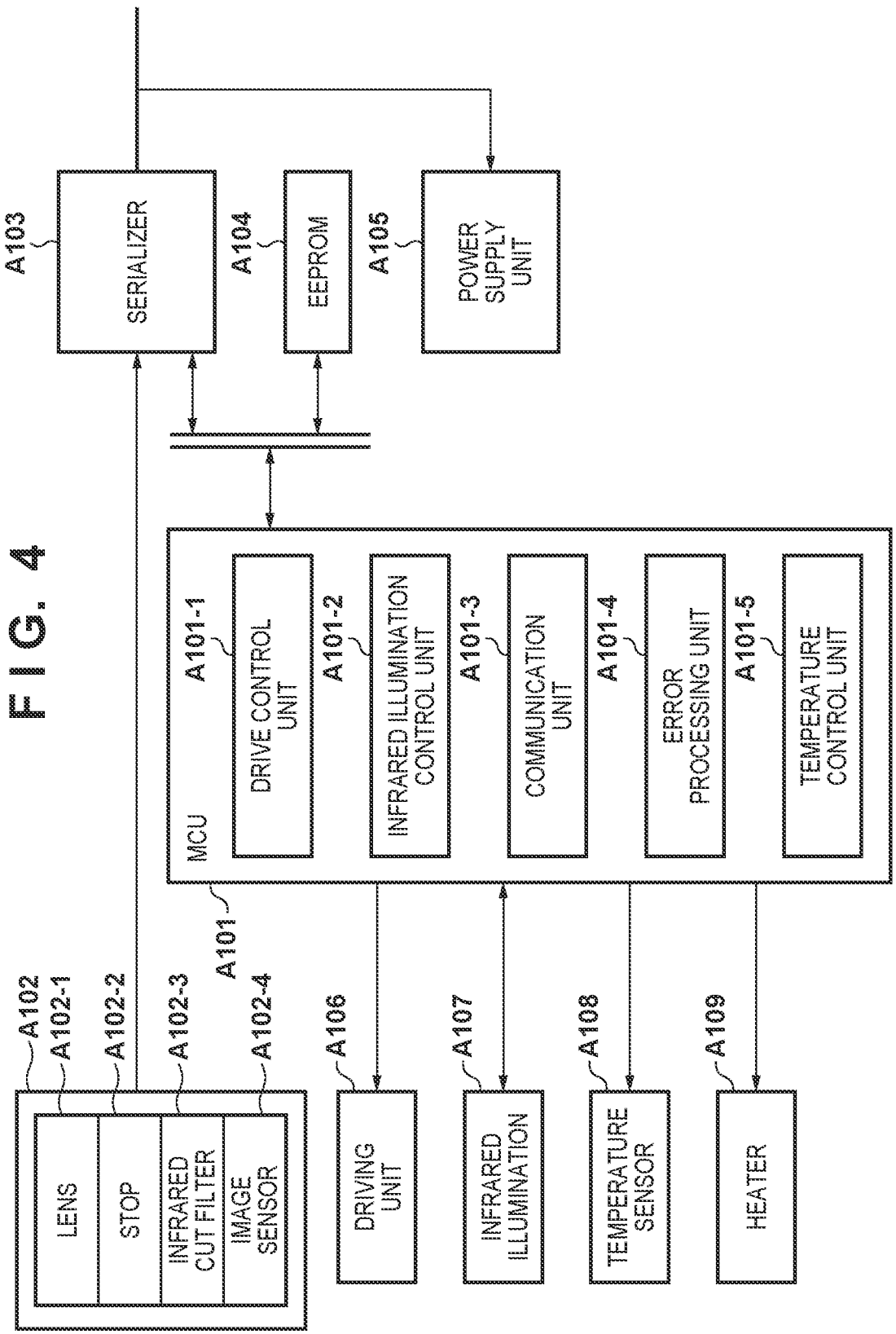
FIG. 4 is a block diagram showing the arrangement of a sensor unit according to one or more aspects of the present disclosure.

FIG. 4 is a block diagram showing the arrangement of a sensor unit according to the second embodiment. As compared with the first embodiment (FIG. 2), this sensor unit additionally includes a temperature sensor A108, a heater A109, an error processing unit A101-4, and a temperature control unit A101-5.

The error processing unit A101-4 performs recovery processing from an error in accordance with the detection of a communication error by a communication unit A101-3.

The temperature control unit A101-5 transmits, to the control unit 2000, the temperature value obtained via the temperature sensor A108 in accordance with a temperature value obtain request from a control unit 2000. The temperature control unit A101-5 controls power supplied to the heater A109 in accordance with a heater control instruction from the control unit 2000. The heater A109 is a heater for heating the inside of the sensor unit.

<Operation of Sensor Unit>

Figure 5:
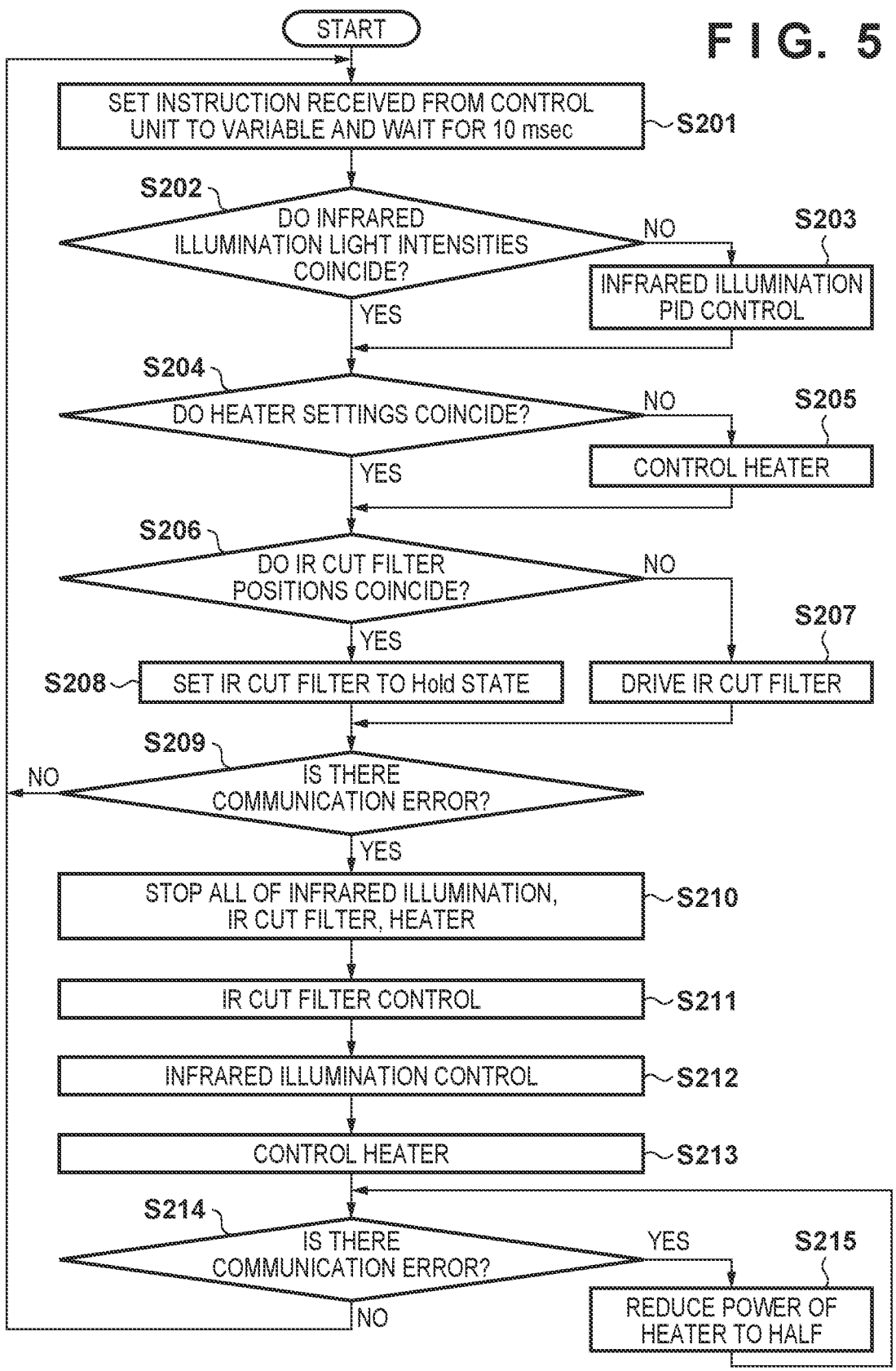
FIG. 5 is a flowchart of processing in the second embodiment.

FIG. 5 is a flowchart of control processing by the sensor unit according to the second embodiment. More specifically, FIG. 5 shows an operation to be performed when the sensor unit receives a control instruction (command) from the control unit 2000 while performing image capturing. The following is a description of a form configured to receive, as control instructions, an instruction concerning control (power control) of the heater A109 in addition to instructions concerning control of an infrared illumination A107 and control of an infrared cut filter A102-3.

In step S201, the communication unit A101-3 receives an instruction from the control unit 2000 via a serializer A103. The communication unit A101-3 sets the received instruction to a variable and waits for a predetermined time (for example, 10 msec).

In step S202, an infrared illumination control unit A101-2 compares the current power value with the power value set to the variable in step S201. If the values coincide with each other, the process advances to step S204. If the values do not coincide with each other, the process advances to step S203. In step S203, the infrared illumination control unit A101-2 starts to adjust a current value flowing in the infrared illumination A107 so as to set the power value set to the variable in step S201. The process then advances to step S204.

In step S204, the temperature control unit A101-5 compares the current temperature setting value with the temperature setting value set to the variable in step S201. If the values coincide with each other, the process advances to step S206. If the values do not coincide with each other, the process advances to step S205. In step S205, the temperature control unit A101-5 starts power control of the heater A109 so as to change the current temperature value to the temperature setting value set to the variable in step S201. The process then advances to step S206.

In step S206, a drive control unit A101-1 checks whether the current position (ON or OFF position) of the infrared cut filter A102-3 coincides with a designated position in the instruction received in step S201. If the positions coincide with each other, the process advances to step S208. If the positions do not coincide with each other, the process advances to step S207.

In step S207, the drive control unit A101-1 starts to drive the infrared cut filter A102-3 in a direction to the designated position. In step S208, the drive control unit A101-1 stops a driving unit A106 and sets the drive state with respect to the infrared cut filter to a hold state. For example, stop excitation is applied to the stepping motor.

In step S209, the communication unit A101-3 checks a communication error state in the serializer A103. If no error has occurred, the process advances to step S201. If an error has occurred, the process advances to step S210.

In step S210, the error processing unit A101-4 performs processing for recovery from a communication error state. That is, the error processing unit A101-4 determines that an error has been caused by an increase in noise on the coaxial cable due to an abrupt change in power consumption accompanying the start of control in steps S203, S205, and S207. Accordingly, the error processing unit A101-4 temporarily stops all the control operations started in steps S203, S205, and S207 and parallelly executed. For example, the error processing unit A101-4 stops the driving unit A106 and turns off the infrared illumination A107 and the heater A109.

In step S211, the error processing unit A101-4 drives the infrared cut filter A102-3 to a designated position via the drive control unit A101-1. Upon moving the filter to the designated position, the error processing unit A101-4 applies stop excitation to the stepping motor to set it in a hold state.

In step S212, the error processing unit A101-4 adjusts a current value flowing in the infrared illumination A107 so as to change the current power value to the power value set to the variable in step S201 via the infrared illumination control unit A101-2.

In step S213, the error processing unit A101-4 controls the heater A109 so as to change the current temperature value to the temperature setting value set to the variable in step S201 via the temperature control unit A101-5.

In step S214, the communication unit A101-3 checks again the communication error state in the serializer A103. If no error has occurred, the process advances to step S201. If an error has occurred, the process advances to step S215.

In step S215, the temperature control unit A101-5 performs control to reduce the power value of the heater A109 to half the current power value. The process then advances to step S214.

The above control is performed to start to execute a plurality of control operations (on the illumination, filter, and heater) to perform, at the occurrence of a communication error at the time of parallel driving of them, recovery processing from the error. More specifically, all the functional operations are temporarily stopped, and various types of control operations are sequentially driven one by one (that is, at exclusive execution timings). Even in this case, when an error has occurred, recovery is made from the communication error by reducing the power of the heater.

As described above, according to the second embodiment, when an instruction is issued for a plurality of control operations (on the illumination, filter, and heater), the sensor unit can perform adaptive processing in consideration of power consumption. That is, when communication errors occur, exclusive control of execution timings with respect to a plurality of control operations is performed to reduce errors in communication via the coaxial cable.

According to the above description, the embodiment is configured to determine presence/absence of a communication error in steps S209 and S214. Instead of this configuration, the embodiment may be configured to monitor the voltage input from the coaxial cable to the serializer A103 and determine whether a voltage variation is equal to or less than a predetermined threshold. That is, the serializer A103 may be configured to determine that a communication error has occurred if the voltage variation exceeds the predetermined threshold.

(Modification)

In addition to the control in the above embodiment, the embodiment may be configured to autonomously perform predetermined additional control upon reception of a control instruction from the control unit.

When, for example, the infrared cut filter is present at the ON position, it is useless to turn on the infrared illumination. For this reason, it is acceptable to autonomously perform control so as to give priority to the movement of the infrared cut filter to the OFF position.

More specifically, when "turn-on instruction for infrared illumination" is received from the control unit, control is performed to temporarily suspend the execution of turn-on control based on the turn-on instruction when the infrared cut filter is at the ON position. That is, since the reception of "instruction to move to OFF position" is predicted, the execution of turn-on control is suspended.

When an extraction instruction to move the infrared cut filter to the OFF position is received during suspension, a determination is made to execute movement control for the infrared cut filter first and then execute suspended turn-on control after the completion of the movement control. In contrast to this, when a timeout occurs in a suspension timer without reception of an instruction to move the infrared cut filter to the OFF position, control may be performed to autonomously move the infrared cut filter to the OFF position and then execute the suspended turn-on control.

In addition, while the infrared illumination is on, it is undesirable to move the infrared cut filter to the ON position. Accordingly, it is also acceptable to autonomously perform control so as to preferentially move the infrared cut filter to the OFF position.

More specifically, when "movement instruction to move infrared cut filter to ON position" is received from the control unit, control is performed to temporarily suspend the execution of movement control to the ON position based on a movement instruction if the infrared illumination is on. That is, since the reception of "instruction to turn off infrared illumination" is predicted, the execution of movement control to the ON position is suspended.

When a turn-off instruction to turn off the infrared illumination is received during suspension, a determination is made to execute turn-off control of the infrared illumination first and then execute the suspended movement control to the ON position after the completion of the turn-off control. In contrast to this, when a timeout occurs in the suspension timer without reception of an instruction to turn off the infrared illumination, it is also acceptable to autonomously perform turn-off control of the infrared illumination and then execute the suspended movement control to the ON position thereafter.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-119838, filed Jul. 27, 2022, which is hereby incorporated by reference herein in its entirety.

What is claimed is:

1. A control apparatus configured to communicate with an external apparatus via a coaxial cable and receive supply of power via the coaxial cable, the control apparatus comprising:
   an image capturing unit;
   a first functional unit that is an infrared illumination unit configured to illuminate infrared light in an image capturing direction of the image capturing unit;
   a second functional unit that is an insertion-extraction control unit configured to perform insertion-extraction control of an infrared cut filter with respect to an optical path of the image capturing unit;
   a power supply unit configured to supply power to the first functional unit and the second functional unit by using power supplied via the coaxial cable; and
   a control unit configured to control the first functional unit and the second functional unit in accordance with a control instruction received from the external apparatus,
   wherein the control unit controls execution timings of a first control operation and a second control operation based on (i) operation contents of the first control operation to be executed based on a first control instruction for the first functional unit, (ii) operation contents of the second control operation to be executed based on a second control instruction for the second functional unit, (iii) an operation state of the first functional unit, and (iv) an operation state of the second functional unit; and
   the control unit executes the second control operation after the infrared illumination unit is turned off if the infrared illumination unit is on, and then executes the first control operation after completion of the second control operation.

2. The control apparatus according to claim 1, wherein the control unit controls execution timings of the first control operation and the second control operation based on a first power consumption consumed when the first control operation is executed and a second power consumption consumed when the second control operation is executed.

3. The control apparatus according to claim 2, wherein the control unit performs control to make execution timings of the first control operation and the second control operation exclusive when a sum of the first power consumption and the second power consumption exceeds a predetermined threshold.

4. The control apparatus according to claim 1, wherein the control unit executes the first control operation after executing the second control operation when the first control instruction indicates a turn-on instruction for the infrared illumination unit and the second control instruction indicates an extraction instruction to extract the infrared cut filter from an optical path of the image capturing unit.

5. The control apparatus according to claim 1, wherein the control unit executes the first control operation after executing a control operation of extracting the infrared cut filter from the optical path of the image capturing unit via the insertion-extraction control unit when the first control instruction indicates a turn-on instruction for the infrared illumination unit and the second control instruction is not received in a predetermined time.

6. The control apparatus according to claim 1, further comprising a determination unit configured to determine whether a communication error has occurred in communication with the external apparatus,
   wherein the control unit stops functional operations of the first functional unit and the second functional unit and then controls the first functional unit and the second functional unit to execute the first control operation and the second control operation so as to make execution timings of the first control operation and the second control operation exclusive when the determination unit determines that there is a communication error upon parallel execution of the first control operation and the second control operation.

7. The control apparatus according to claim 6, wherein the determination unit determines that there is a communication error, if a voltage variation in the coaxial cable exceeds a predetermined threshold.

8. A control method for a control apparatus configured to communicate with an external apparatus via a coaxial cable and receive supply of power via the coaxial cable,
   the control apparatus including:
   an image capturing unit;
   a first functional unit that is an infrared illumination unit configured to illuminate infrared light in an image capturing direction of the image capturing unit;
   a second functional unit that is an insertion-extraction control unit configured to perform insertion-extraction control of an infrared cut filter with respect to an optical path of the image capturing unit; and
   a power supply unit configured to supply power to the first functional unit and the second functional unit by using power supplied via the coaxial cable,
   the control method comprising:
   receiving a first control instruction for the first functional unit and a second control instruction for the second functional unit;
   determining execution timings of a first control operation and a second control operation based on (i) operation contents of the first control operation to be executed based on a first control instruction for the first functional unit, (ii) operation contents of the second control operation to be executed based on a second control instruction for the second functional unit, (iii) an operation state of the first functional unit, and (iv) an operation state of the second functional unit, thereby the second control operation is to be executed after the infrared illumination unit is turned off if the infrared illumination unit is on, and then the first control operation is to be executed after completion of the second control operation; and controlling the first functional unit and the second functional unit based on the determined execution timings.

* * * * *